United States Patent [19]

Marchal et al.

[11] Patent Number: 4,484,889
[45] Date of Patent: Nov. 27, 1984

[54] INSTALLATIONS FOR PROCESSING A PRODUCT IN A GAS MEDIUM

[75] Inventors: Paul H. Marchal, Leimbach; Guy F. Doucin, Chelles, both of France

[73] Assignee: Air Industrie, Courbevoie, France

[21] Appl. No.: 470,983

[22] Filed: Mar. 1, 1983

[30] Foreign Application Priority Data

Mar. 3, 1982 [FR] France .................................. 82 03544

[51] Int. Cl.³ .......................... F24H 1/00; F24C 3/10; F27B 9/28
[52] U.S. Cl. ..................................... 432/219; 432/59; 432/221
[58] Field of Search ...................... 432/8, 59, 219, 221

[56] References Cited

U.S. PATENT DOCUMENTS 4,092,100  5/1978  Phillips ............................... 432/219
4,207,058  6/1980  Petersohn et al. .................... 432/59

Primary Examiner—John J. Camby
Attorney, Agent, or Firm—Larson and Taylor

[57] ABSTRACT

The installation comprises a blowing chamber (1) in which takes place the heat treatment of the product (2) and a recovery chamber (5) surrounding this blowing chamber (1). One at least of the two horizontal walls of the recovery chamber (5) is formed so as to present, on the outside, a flattened outer duct (6) through which the treatment gas is admitted into the recovery chamber (5) and, on the inside, a flattened inner duct (7) through which a part of the treatment gas is discharged from the recovery chamber (5).

10 Claims, 2 Drawing Figures

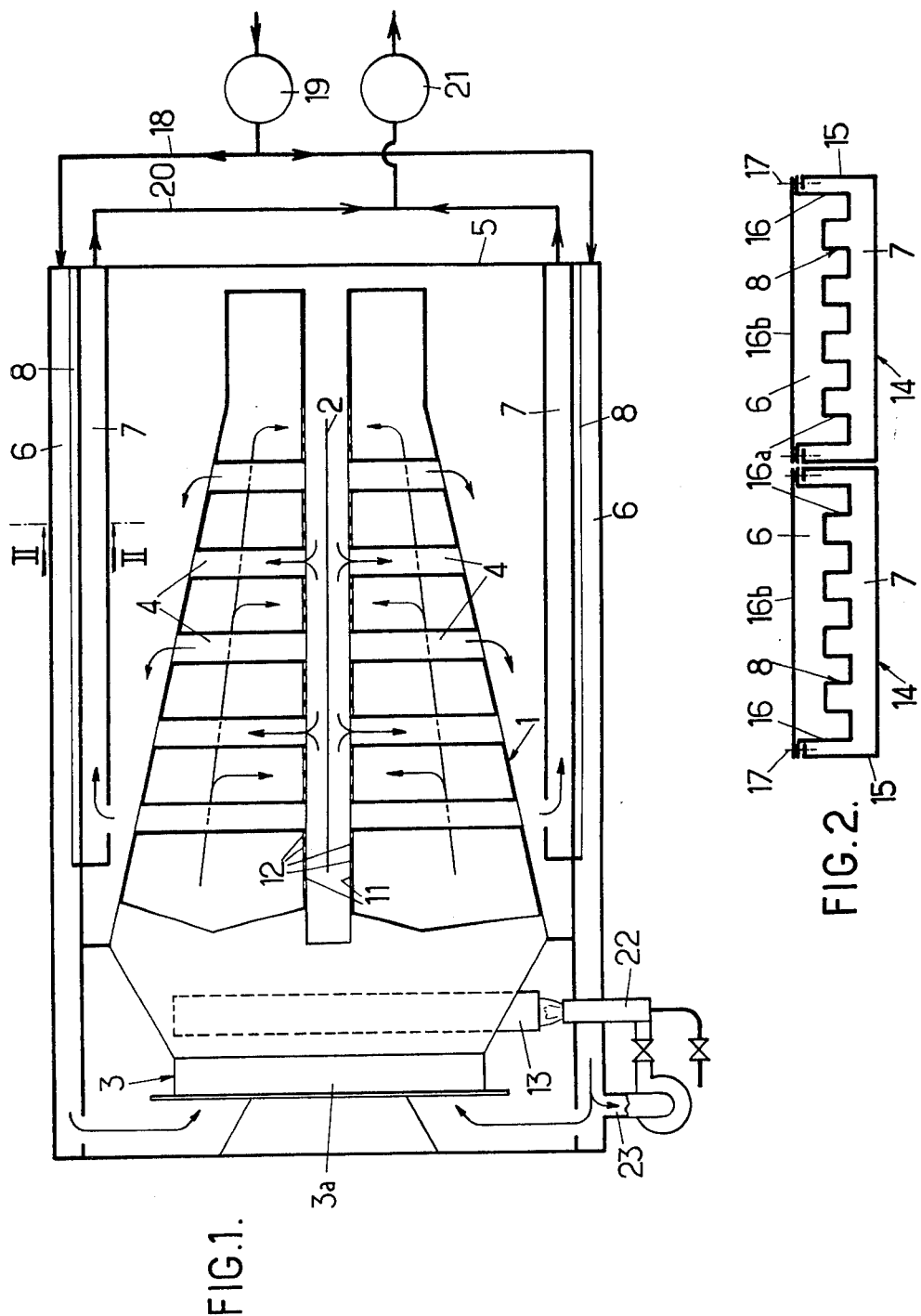

INSTALLATIONS FOR PROCESSING A PRODUCT IN A GAS MEDIUM

The invention relates to installations for processing a product in a gas medium, particularly to drying or heat treatment installations.

Such installations are known, particularly from published French patent application 2 391 437 and they comprise: at least one blowing chamber in which is carried out the heat treatment on a product (in strip or other form) moving horizontally in this blowing chamber; supply means for supplying this blowing chamber with treatment gas; discharge passages for discharging the treatment gas from the blowing chamber; a recovery chamber surrounding the blowing chamber at least partially and providing partial recycling to the supply means of the treatment gas coming from the discharge passages; intake means for admitting treatment gas into the recovery chamber; and discharge means for discharging a part of the treatment gas from the recovery chamber.

The aim of the present invention is to integrate the intake means and the discharge means into the structure of the assembly formed by the blowing chamber and the recovery chamber.

Another aim of the invention is to provide a particularly compact installation taking up less space.

A further aim of the invention is an installation in which the heat losses are lower than in conventional installations known up to present, while having recourse to a minimum of heat insulating or lagging means.

Yet another aim of the invention is to provide an installation in which the heat losses due to infiltration of the ambient air through the components of the recovery chamber are very much reduced.

A further aim is to reduce the condensation phenomena at the level of the means for discharging the treatment gas from the recovery chamber.

Finally, another aim of the invention is to provide an installation in which the circuit for the intake treatment gas and the circuit for the discharge treatment gas have a minimum pressure drop.

In accordance with the invention, practically the whole of at least one of the two horizontal walls of the recovery chamber is formed so as to present on the outside a plurality of outer flattened ducts orientated perpendicularly to the moving direction of the product and forming the treatment gas intake means through which this treatment gas is sucked in for delivery into the recovery chamber in the vicinity of the intake means, and on the inside a plurality of inner flattened ducts orientated perpendicularly to the moving direction of the product and forming the discharge means for a part of the treatment gas through which this part of the treatment gas is sucked from a zone of the recovery chamber situated between the zone of this chamber into which opens the intake means formed by the outer flattened duct and the zone of this chamber into which open the discharge passages, a common dividing wall being provided between each outer and inner flattened duct, this common dividing wall being formed so as to promote heat exchange between the intake treatment gas (cold) and the discharge treatment gas (hot), the intake treatment gas and the discharge treatment gas flowing in counter-current fashion respectively in the outer duct and in the inner duct, the assembly of outer ducts being supplied in parallel with the intake gas and the assembly of inner ducts being supplied in parallel with the discharge gas.

With this arrangement, a particularly compact installation may be constructed taking up reduced space.

Moreover, the fact that one or both horizontal walls of the recovery chamber are formed by the two outer (cold intake treatment gas) and inner (hot discharge treatment gas) ducts allows low heat losses to be obtained while having recourse to a minimum of lagging means since it is the duct through which the cold treatment gas flows which is located on the outside.

Moreover, the heat losses corresponding to the infiltration of the ambient air through the component parts of the recovery chamber are reduced since, if such infiltrations occur, they are picked up either by the outer duct through which the intake treatment gas flows and are then preheated before being fed into the recovery chamber by the discharge gas or by the inner duct through which the discharge treatment gas flows and are not then prejudicial to the heat balance of the processing installation.

In addition, condensation phenomena in the inner duct through which the discharge treatment gas flows are reduced since this duct is not in contact with the cold ambient atmosphere.

Finally, it is possible to form a circuit for the intake treatment gas and a circuit for the discharge treatment gas which present a minimum pressure drop since the intake treatment gas is delivered in the vicinity of the fan and the discharge treatment gas is taken from a zone in the recovery chamber into which the discharge passages open coming from the processing zone of the strip product.

The invention consists, apart from the arrangements which have just been discussed, of certain other arrangements which are used preferably at the same time and which will be more explicitly discussed hereafter.

The invention will, in any case, be well understood from the complement of description which follows as well as the acompanying drawings, which complement and drawings are relative to a particular embodiment of the invention and of course comprise no limiting character.

FIG. 1, of these drawings, is a schematical section of an installation constructed according to a first embodiment of the invention;

FIG. 2 is a partial section along II—II of FIG. 1.

In FIGS. 1 and 2, an installation has been shown for drying a strip product 2 by means of hot air.

This installation comprises a blowing chamber 1 in which the product 2 is dried (in strip or other form) which is moved horizontally in this blowing chamber 1 by means not shown such as conveyors, lateral chains, etc . . . in a direction perpendicular to the plane of the section of FIG. 1. To this end, an installation may be used such as the one described in published French patent application 2 391 437.

The blowing chamber 1 comprises then two blowing walls 11 situated opposite each other and between which the product 2 is processed by the effect of hot drying air jets coming from orifices 12 formed in this blowing wall 11.

Supply means 3 are provided for supplying the blowing chamber 1 with hot air: these supply means 3 may comprise a fan 3a disposed on one side of blowing chamber 1 and heating elements 13 which will be discussed more explicitly hereafter.

The hot air blown on to product 2 through orifices 12 in the blowing wall 11 is taken up by discharge passages 4 which discharge this air from the blowing chamber 1. A recovery chamber 5 surrounds blowing chamber 1 at least partially and provides partial recycling of the air coming through discharge passages 4 to the supply means 3.

The installation is then completed by:

intake means for admitting drying air into the recovery chamber 5, and discharge means for discharging a part of the drying air from the recovery chamber 5.

The two horizontal walls of recovery chamber 5 are arranged so as to present respectively, on the outside, a plurality of outer flattened ducts 6 forming the drying air intake means and through each of which this drying air is sucked in to be delivered into the recovery chamber in the vicinity of supply means 3, and, on the inside, a plurality of inner flattened ducts 7 forming the means for discharging a part of the drying air and through each of which this part of the drying air is sucked from a zone of the recovery chamber 5 situated between the zone in this chamber into which open the supply means formed by the outer flattened duct 6 and the zone of this chamber into which the discharge passages 4 open.

A common dividing wall 8 is provided between each outer 6 and inner 7 flattened duct, this common wall 8 being formed so as to promote heat exchange between the intake air which is cold and the discharge air which is hot.

The cold intake air and the hot discharge air flow in counter current fashion respectively in the outer duct 6 and the inner duct 7, whereby the heat exchange between the cold intake air and the hot discharge air is improved.

The outer duct 6 and the inner duct 7 are orientated perpendicularly to the direction of travel of product 2.

The assembly of outer ducts 6 is supplied in parallel with the intake gas.

The assembly of inner ducts 7 is supplied in parallel with the discharge gas.

Also, with a view to promoting heat exchange between the cold intake air and the hot discharge air, it is advantageous to give to the common dividing wall 8, separating the outer 6 and inner 7 ducts, the form of a corrugated wall (FIG. 2).

From the constructional point of view, and as shown in FIG. 2, the wall of the recovery chamber 5 may be formed by a succession of hollow panels 4, each hollow panel 4 comprising:

a U shaped frame 15, a complementary element 16 secured to the wings of the U shaped frame 15, this complementary element being formed by corrugated element 16a and a flat element 16b which is a poor conductor of heat, and removable fixing means 17 for fitting complementary element 16 on frame 15 and removing it therefrom.

The outer flattened duct 6 is then formed by the flat element 16b and the corrugated element 16a, and the flattened inner duct 7 is formed by corrugated element 16a and frame 15.

By removing the complementary element 16, access may be readily had to the inner flattened duct 7 for cleaning same, and similarly for cleaning the corrugated element 16a which, during operation, is in contact with the discharge air.

The assembly of the flattened outer ducts 6 opens into a general intake duct 18, having a single self-regulating valve 19 of the damper kind and the assembly of inner flattened ducts 7 opens into a general discharge duct 20 having a single adjustment device 21 of the register kind.

These intake 18 and discharge 20 ducts are disposed perpendicularly to the outer 6 and inner 7 ducts; moreover, they have advantageously a common wall.

When the heating elements 13 are formed by hot tubes fed from burners 22, it is advantageous to dispose the base of these burners 22 in the outer flattened duct 6, or in a manifold combining an assembly of outer ducts 6 at the level of supply means 3.

FIG. 1 shows such an arrangement which provides good cooling of the base of burners 22.

In addition, it is advantageous to supply burners 22 with air from this outer duct 6 since it has been heated by the air flowing through the inner duct 7.

To this end, a tapping 23 is provided in this outer duct 6 for supplying burners 22.

We claim:

1. An installation for processing a product in a gas medium, particularly a drying or heat treatment installation, said installation comprising:

means defining at least one blowing chamber in which the product moves horizontally, treatment gas supplying means for supplying the blowing chamber with treatment gas, means defining a recovery chamber having two horizontal walls and disposed so as to surround the blowing chamber and the supplying means, means defining a plurality of discharge passages each having an inlet to said blowing chamber and an outlet to said recovery chamber so that a partial recycling of the treatment gas is provided from said discharge passages to said supplying means, intake means for admitting treatment gas into said recovery chamber, and discharge means for discharging a part of the treatment gas from said recovery chamber, at least one of the two horizontal walls of the recovery chamber comprising:

means defining a plurality of flattened outer ducts forming said intake means and being oriented perpendicularly to the direction of movement the product, each of said outer ducts having an outlet in communication with the supply means, and means defining a plurality of flattened inner ducts forming said discharge means and being oriented perpendicularly to the direction of movement of the product, each of said inner ducts having an inlet situated between the outlets of the outer ducts and the outlets of discharge passages, said means defining said inner and outer ducts including a common dividing wall, provided between each outer duct and inner duct, for promoting heat exchange between the intake treatment gas and the discharge treatment gas, the intake treatment gas and the discharge treatment gas flowing in countercurrent relation in the outer and inner ducts, and the outer ducts being supplied in parallel with the intake gas, and the inner ducts being supplied in parallel with the discharge gas.

2. The installation according to claim 1, characterized by the fact that two horizontal walls of the recovery chamber are formed so as to provide a said outer duct and a said inner duct.

3. The installation according to claim 1, characterized by the fact that the common dividing wall separating said outer and inner ducts has a corrugated shape.

4. The installation according to claim 1, characterized by the fact that the outer ducts open into means defining a general intake duct, and the inner ducts open into means defining a general discharge duct, this intake duct and this discharge duct being disposed perpendicularly to said outer and inner ducts and having a common wall.

5. The installation according to claim 4, characterized by the fact that the general intake duct is connected to a single self-regulating valve of the damper type and the general discharge duct is connected to a single adjustment device of the register type.

6. The installation according to claim 1, characterized by the fact that the walls of the recovery chamber are formed by a succession of hollow panels each comprising a U shaped frame having wings and a complementary component secured to the wings of said frame, this complementary component forming the outer duct whereas the inner duct is defined by this complementary component and the frame.

7. The installation according to claim 6, characterized by the fact that the complementary component is formed by a corrugated element and a flat element which is a poor heat conductor, the outer duct being formed by the flat element and the corrugated element, and the inner duct being formed by the corrugated element and the frame.

8. The installation according to claim 6, characterized by the fact that removable securing means are provided for fitting the complementary component on the frame and removing it therefrom.

9. The installation according to claim 1, wherein said supply means includes heating elements formed by burners, characterized by the fact that the base of these burners is disposed in the outer duct or in a manifold combining an assembly of outer ducts at the level of the supply means.

10. The installation according to claim 9 and in which the treatment gas comprises air, characterized by the fact that the burners are supplied with air from the outer duct.

* * * * *